(12) United States Patent
De Graaf (10) Patent No.: US 11,975,789 B2
(45) Date of Patent: May 7, 2024

(54) CARGO BIKE (71) Applicant: Cirade, Terneuzen (NL)

(72) Inventor: Silvester De Graaf, Terneuzen (NL)

(73) Assignee: Cirade, Terneuzen (NL)

(*) Notice: Subject to any disclaimer, the term of this patent is extended or adjusted under 35 U.S.C. 154(b) by 0 days.

(21) Appl. No.: 17/238,131

(22) PCT Filed: Nov. 19, 2019

(86) PCT No.: PCT/NL2019/050754
§ 371 (c)(1),
(2) Date: Apr. 22, 2021

(87) PCT Pub. No.: WO2020/111937
PCT Pub. Date: Jun. 4, 2020

(65) Prior Publication Data
US 2023/0097235 A1 Mar. 30, 2023

(30) Foreign Application Priority Data
Nov. 27, 2018 (NL) .................................. 2022079

(51) Int. Cl.
*B62K 15/00* (2006.01)
*B62K 5/06* (2006.01)
*B62K 5/05* (2013.01)
*B62K 7/04* (2006.01)

(52) U.S. Cl.
CPC .............. *B62K 15/008* (2013.01); *B62K 5/06* (2013.01); *B62K 5/05* (2013.01); *B62K 7/04* (2013.01)

(58) Field of Classification Search
None
See application file for complete search history.

(56) References Cited

U.S. PATENT DOCUMENTS

| 9,428,239 B1 | 8/2016 | Bell et al. |
| 2004/0056452 A1 | 3/2004 | Mihelic |

(Continued)

FOREIGN PATENT DOCUMENTS

| CN | 2133515 Y | 5/1993 |
| CN | 201136574 Y | 10/2008 |

(Continued)

OTHER PUBLICATIONS

International Search Report and Written Opinion—PCT/NL2019/050754—dated Jan. 17, 2020.

*Primary Examiner* — Kevin Hurley
(74) *Attorney, Agent, or Firm* — Banner & Witcoff, Ltd.

(57) ABSTRACT

Cargo bike comprising a collapsible frame, the collapsible frame being adjustable between an elongate state in which the collapsible frame positions a front and rear wheel of the cargo bike at a first distance along a longitudinal axis of the cargo bike, and a collapsed state in which the collapsible frame positions the front and rear wheel at a second, smaller distance along the longitudinal axis of the cargo bike, a cargo holder for holding cargo that comprises a face that extends substantially transversely to the longitudinal axis, and wherein in the collapsed state of the collapsible frame at least one of the wheels extends transversely to the longitudinal axis of the cargo bike and at least partially overlaps with the transversely extending face.

19 Claims, 6 Drawing Sheets

(56) References Cited

U.S. PATENT DOCUMENTS

2005/0062254 A1\* 3/2005 Nicolai ................ B62M 11/145
  280/260
2011/0148069 A1   6/2011 Ho
2013/0093157 A1   4/2013 Ball et al.

FOREIGN PATENT DOCUMENTS

| CN | 103802878 A      |   | 5/2014  |
|----|------------------|---|---------|
| CN | 205661597 U      |   | 10/2016 |
| CN | 115402453 A      | * | 11/2022 |
| DE | 1931819 U        |   | 1/1966  |
| DE | 29911684 U1      |   | 1/2000  |
| DE | 102010006378 A1  |   | 8/2011  |
| DE | 102009024522 A1  |   | 12/2011 |
| DE | 102016101870 A1  |   | 8/2016  |
| EP | 0026800 A1       |   | 4/1981  |
| EP | 2371668 A1       |   | 10/2011 |
| JP | 2007209731 A     |   | 8/2007  |
| KR | 20100049465 A    |   | 5/2010  |
| KR | 102316129 B1     | * | 10/2021 |
| PH | 2014000320 A1    |   | 5/2016  |
| TW | M562809 U        |   | 7/2018  |
| WO | 2014080988 A1    |   | 5/2014  |
| WO | 2015014751 A1    |   | 2/2015  |
| WO | 2016201549 A1    |   | 12/2016 |

\* cited by examiner

CARGO BIKE

CROSS-REFERENCE TO RELATED APPLICATIONS

This application is a U.S. National Stage application under 35 U.S.C. § 371 of International Application PCT/NL2019/050754 (published as WO 2020/111937 A1), filed Nov. 19, 2019, which claims the benefit of priority to Application NL 2022079, filed Nov. 27, 2018. Benefit of the filing date of these prior applications is hereby claimed. Each of these prior applications is hereby incorporated by reference in its entirety.

The invention relates to a cargo bike, in particular a cargo bike with a collapsible frame.

Cargo bikes are generally known and comprise a frame that positions a front and rear wheel of the cargo bike at distance along a longitudinal axis of the cargo bike. Typically the cargo bike includes a cargo holder that is e.g. used to hold and/or transport goods and/or people, in particular children, in a convenient way. Commonly the cargo holder includes a face that extends transversely to the longitudinal axis of the cargo bike, such as a transverse side face or bottom face of the cargo holder. The cargo holder causes the cargo bike to be relatively large compared to for example conventional bi- or tricycles. Cargo bikes generally include two- and three-wheeled arrangements. In case of a three-wheeled arrangement, such as a tricycle, for example two front wheels are provided at either side of the longitudinal axis of the cargo bike on respective longitudinal side faces of the cargo holder and the frame positions the front wheels at a distance from the rear wheel along the longitudinal axis of the cargo bike. Furthermore, cargo bikes usually comprise a drivetrain for driving the bike, pedals connected to a crankshaft for engaging the drivetrain, a seating arrangement for a user to take a seat on, and a steeling arrangement for steering the cargo bike. Although, as mentioned above, cargo bikes are convenient e.g. for transporting goods and/or people/children, a downside of the known cargo bikes is their relatively large size which leads to parking and storage problems of the cargo bike.

To alleviate disadvantages, cargo bikes with a foldable frame have been proposed in the past that are designed to fold between an elongate state and a folded state. Compared to the elongate state, the frame generally positions the front and rear wheel(s) at a smaller distance along the longitudinal axis of the cargo bike in the folded state. This may be desirable for facilitating parking and/or storage of the cargo bike.

Although known cargo bikes with foldable frames can be quite satisfactory for holding/transporting goods and/or people/children it has been found that the compactness of the cargo bike in the folded state leaves something to be desired. In particular, it has proven difficult in practice to provide a cargo bike with an easy to operate foldable frame that is suitably compact in the folded state.

The invention aims at alleviating one or more of the aforementioned disadvantages. In particular, the invention aims to provide a cargo bike with a collapsible frame with improved parking and/or storage capability while maintaining a user-friendly collapsible construction.

To that end, the invention provides a cargo bike comprising a collapsible frame, the collapsible frame being adjustable between an elongate state in which the collapsible frame positions a front and rear wheel of the cargo bike at a first distance along a longitudinal axis of the cargo bike, and a collapsed state in which the collapsible frame positions the front and rear wheel at a second, smaller distance along the longitudinal axis of the cargo bike, a cargo holder for holding cargo that comprises a face that extends substantially transversely to the longitudinal axis, and wherein in the collapsed state of the collapsible frame at least one of the wheels extends transversely to the longitudinal axis of the cargo bike and at least partially overlaps with the transversely extending face.

By allowing at least one of the wheels to extend transversely to the longitudinal axis of the cargo bike and at least partially overlap the transversely extending face of the cargo holder, the relevant wheel can conveniently be placed out of the way. In particular, the transversely extending face, such as a transverse side face or bottom face of the cargo holder, may provide space for at least partly accommodating the relevant wheel, preferably accommodating a section of the wheel, such as a circular sector of the wheel.

Within the context of this application, for a wheel to extend transversely to the longitudinal axis of the cargo bike is to be understood as that a side face of the wheel extends substantially transversely to the longitudinal axis of the cargo bike. Such side face may in particular imply a circular side face of the wheel. The term 'extends transversely' may in the context of this application be considered to mean as extends across, that is to say deviations with respect to at right angles to the longitudinal axis of the cargo bike should fall within the scope. For instance, when the wheel or face extends transversely to the longitudinal axis of the cargo bike, it may diverge from the right angle to the longitudinal axis of the cargo bike by −30 to 30 degrees, preferably less than −20 to 20 degrees, such as for example −10 to 10 degrees. Also, within the context of this application, the term 'partially overlaps with' is to be construed as part of the wheel or part of a wheel support structure of the wheel, in particular a wheel stay, is placed onto the transversely extending face. In particular, part of the wheel or wheel face may extend along e.g. the transverse side face of the cargo holder and follow the inclination of the transverse side face of the cargo holder. That is to say, part of the wheel or face may e.g. extend substantially parallel to the (inclined) transverse side face of the cargo holder. This way, in the collapsed state a lower part of the wheel or wheel face may extend underneath the bottom face of the cargo holder. Thereby, the wheel may be stowed away even more conveniently.

Preferably, a locking mechanism is provided for releasably securing the relevant wheel in an end position of the collapsed state, for example part of the wheel and/or wheel support structure that overlaps the transversely extending face may be secured thereto. Thereby, the relevant wheel may conveniently be secured out of the way and be released to return to the elongate state.

If in the collapsed state of the frame a wheel hub of the at least one wheel that at least partially overlaps with the transversely extending face lies substantially within an envelope defined by transverse boundaries of the cargo bike, it can be counteracted that the wheel hub protrudes transversely to the cargo bike. Preferably, the wheel hub lies within an envelope defined by a quarter of the distance between the transverse boundaries extending on either side of the longitudinal axis. This way, it may be achieved that a substantial part of the wheel lies in the envelope defined by the transverse boundaries of the cargo bike, which in turn may lead to a more compact cargo bike in the collapsed state. Transverse boundaries are for example defined by longitudinal side faces of the cargo holder, or in case of a tricycle e.g. by side faces or planes of symmetry of the front wheels that extend along the longitudinal side faces of the cargo holder.

When in the collapsed state of the frame a wheel hub of the at least one wheel that at least partially overlaps with the transversely extending face is located at or near the longitudinal axis, in particular near or along the plane of symmetry of the cargo holder, it may be facilitated that the wheel protrudes even less transversely to the cargo bike. Thus, the construction can be made even more compact in the collapsed state.

By hingedly connecting at least a portion of the collapsible frame, in particular a wheel support structure of the cargo bike, to the collapsible frame so as to be pivotable about an upright axis that extends substantially transversely to the longitudinal axis, pivoting the relevant wheel to extend substantially transversely to the longitudinal axis of the cargo bike may be facilitated. In particular, by hingedly connecting the wheel support structure, such as a wheel stay, it may be facilitated that the wheel support structure may be placed onto the transversely extending face. The wheel support structure or so-called wheel stay may comprise a seat stay and/or chain stay. Preferably, a stay hinge is provided to allow at least a portion of the collapsible frame to pivot with respect to the collapsible frame. This way, a relatively simple collapsible construction may be achieved.

Thus is described a cargo bike comprising a collapsible frame, the collapsible frame being adjustable between an elongate state and a collapsed state as described above, further comprising a cargo holder having a face that extends substantially transversely to the longitudinal axis of the cargo bike, wherein in the collapsed state of the collapsible frame at least one of the wheels extends transversely to the longitudinal axis of the cargo bike and at least partially overlaps with the transversely extending face. In particular, when at least a portion of a wheel support structure of the cargo bike as portion of the collapsible frame is hingedly connected to a remaining portion of the collapsible frame, the portion of the wheel support structure and/or wheel stay may conveniently be pivoted about a pivot axis that extends substantially transversely to the longitudinal axis of the cargo bike. This way, the portion of the wheel support structure and/or wheel stay may be collapsed towards the transversely extending face of the cargo holder such that the respective front and/or rear wheel in the collapsed state at least partially overlaps with the transversely extending face, hence allowing the respective front and/or rear wheel to be conveniently placed out of the way, in particular together with at least a portion of the wheel support structure such as the saddle stay and/or chain stay. Thus, a particularly compact construction in the collapsed state may be achieved that is accessible and relatively easy to adjust between the elongate and collapsed state. In this way, the cargo bike may conveniently be provided with typical bike wheels, that is to say relatively common, commercially available wheels and tires having a nominal rim and tire size such as circa 559 mm, 590 mm, 622 mm, or 635 mm according to the European Tyre and Rim Technical Organization (ETRTO) standard. Thereby, the cargo bike provided with a portion of the wheel support structure that is hingedly connected to the remaining portion of the collapsible frame may be equipped with typical wheels that benefit the cycling comfort of the cargo bike in the elongate state, whilst maintaining a particularly compact construction in the collapsed state that is relatively easy to operate and adjust between the respective elongate and collapsed state. In particular, the portion of the wheel support structure may be hingedly connected via at least one hinge, e.g. provided on a chain stay member, a seat stay member and/or fork member(s) of the wheel support structure. That is to say, the at least one hinge is provided on the wheel support structure inbetween a wheel suspension and e.g. a crankshaft and/or a connection of the wheel support structure to a remaining part of the collapsible frame, such as a seat tube or main tube.

When at least a portion of the collapsible frame, preferably the entire frame, is pivotable about a horizontal axis which, in the elongate state, substantially extends along the longitudinal axis of the cargo bike, pivoting the relevant wheel to extend substantially transversely to the longitudinal axis of the cargo bike may be facilitated. In the context of this application, the term 'extends along' is to be construed to mean parallel to or to coincide with e.g. the longitudinal axis of the cargo bike.

If the collapsible frame comprises a base part and a telescoping part that is slidable relative to the base part along the longitudinal axis between the elongate state and the collapsed state, and vice versa, then it may be allowed that the telescoping part is slid into and out of the base part. This way, in the collapsed state a relatively compact construction may be obtained. By arranging the base part as a sleeve around the telescoping part, such that the telescoping part is slidable through the base part, a relatively simple construction for collapsing the frame may be accomplished. Preferably, the base part is slidable relative to a further sleeve that is provided on the cargo holder such that the base part can slide telescopingly with respect to the cargo holder along the longitudinal axis. This allows a particularly compact construction in the collapsed state of the cargo bike.

By providing a first hinge that hingedly connects a first part to a second part of the collapsible frame, the two parts may be folded towards each other. If the first hinge is lockable in the respective elongate and collapsed states, a relatively stable construction of the cargo bike may be accomplished in both respective states. Preferably, the first hinge is located underneath a bottom face of the cargo holder. That is to say, the first hinge is preferably located within an envelope defined by the boundaries of the bottom face of the cargo holder. By locating the first hinge underneath the bottom face, it may be facilitated that in the collapsed state the two parts may conveniently be stowed away underneath the bottom face of the cargo bike.

By further providing a second hinge that hingedly connects the second part to a third part of the collapsible frame, and wherein the second hinge is lockable in the respective elongate and collapsed states, it can be facilitated that the respective parts may collapse towards each other, not unlike an accordion. This way a particularly compact construction may be accomplished in the collapsed state. In particular, when the first and second hinge are placed such that at least two parts of the collapsible frame are allowed to partly extend along each other in the collapsed state.

If a drivetrain of the cargo bike includes a toothed belt for power transmission in the drivetrain, a flexible construction of the drivetrain can be achieved that is foldable. This is particularly useful in combination with the pivotable portion, in particular a wheel support structure, of the collapsible frame as this may allow a portion of the drivetrain to pivot with this pivotable portion. A toothed belt guide may be placed, e.g. near or as part of the stay hinge, to guide the toothed belt and facilitate pleating of the toothed belt, e.g. around the stay hinge.

When a seat tube of the cargo bike for receiving a seat and/or seat post is fixed to the pivotable portion, in particular the wheel support structure, of the cargo bike, such that they are pivotable together with the collapsible frame or with respect to the collapsible frame, a particularly simple and elegant construction can be achieved that allows the seat to be conveniently stowed along the transverse side or bottom face of the cargo holder together with the relevant wheel. This facilitates the ease of use of the collapsible frame whilst maintaining or improving the compactness of the cargo bike in the collapsed state.

If a seat tube of the cargo bike for receiving a seat and/or seat post is hingedly connected to the collapsible frame, such that the seat tube is foldable between a folded-in position in which the seat tube is located nearer a plane that extends underneath and substantially parallel to the transverse bottom face of the cargo holder, and a folded-out position in which the seat tube is located further away from said plane, in particular such that the seat tube extends substantially upright to said plane to provide a seating arrangement in the elongate state of the collapsible frame, stowing away of the collapsible frame underneath the bottom face of the cargo holder in the collapsed state can be further facilitated. Thereby, in the collapsed state the seat tube including the seat and/or seat post may extend substantially underneath the bottom face of the cargo holder. This way a particularly elegant and compact construction can be achieved in the collapsed state. Preferably, a quick lock mechanism is provided, e.g. on the cargo bike or on the seat post, that allows simple lowering and raising of the seat height. This way, the seat tube and seat assembly may be adjusted between a lowered and raised state relatively easily, e.g. while taking a user's preferred use height of the seat into account.

If in the collapsed state substantially the entire collapsible frame is stowed away along faces of the cargo holder that extend transversely to the longitudinal axis, such as the transverse side face and bottom face of the cargo holder, and the collapsible frame lies substantially within an envelope defined by transverse boundaries of the cargo bike, it can be counteracted that parts of the collapsible frame protrude outside said envelope. Thereby, in the collapsed state a particularly elegant and compact construction may be obtained.

A further drawback of conventional cargo bikes, with or without foldable frames, is that goods and/or people/children should not be left behind unattended in the cargo holder, for example while doing errands or during shopping. The invention further aims to mitigate this drawback of conventional cargo bikes. In particular, the invention aims to provide a cargo bike with a collapsible frame that in the collapsed state may relatively easily be brought along by foot.

As mentioned before, by arranging at least one wheel of the cargo bike in the collapsed state of the collapsible frame to be placed along and onto the transversely extending face, such that the at least one wheel at least partially overlaps with the transversely extending face, allows the relevant wheel to be placed out of the way. In addition, by placing the relevant wheel along and onto the transversely extending face, such as the transverse side face or bottom face of the cargo holder, allows a user to relatively easily position his/herself substantially squarely behind the transverse side face of the cargo bike. Thereby, the cargo bike in the collapsed state may readily be used as a pushcart. In this manner, goods and/or people/children do not have to be removed from the cargo holder, e.g.

while doing errands or when going shopping. This saves a lot of time and hassle, especially when taking the children. Purchased goods, e.g. groceries, may conveniently be transported in the cargo holder even together with people/children. After shopping the cargo bike may relatively easily be converted back to a riding state and can be ridden relatively quickly. This may save a lot of time and energy.

If the cargo bike further comprises at least one support supported on the frame and/or the cargo holder for supporting the cargo bike on a surface, in particular the ground, a relatively simple and stable construction, in particular in the collapsed state, may be achieved relatively easily.

When the cargo bike comprises a retractable assembly for the at least one support that is adjustable between a retracted state in which the at least one support is retracted in a direction of the frame and/or cargo holder, and a support state in which the at least one support is lowered for supporting the cargo bike on a surface, a relatively simple construction may be provided for stowing the at least one support away, e.g. while riding, or lowering it for stability, e.g. in the collapsed state, relatively easily. When the at least one support comprises or is formed by a wheel, in particular a swivel wheel, the cargo bike may be displaced relatively easily and stably in the collapsed state. This is particularly useful when the cargo bike is used as a pushcart in the collapsed state.

The invention will be further elucidated on the basis of exemplary embodiments which are represented in the drawings. In the drawings.

In the Figures identical or corresponding parts are represented with the same reference numerals. The drawings are only schematic representations of embodiments of the invention, which are given by manner of non-limiting exemplary embodiments.

Figure 1:
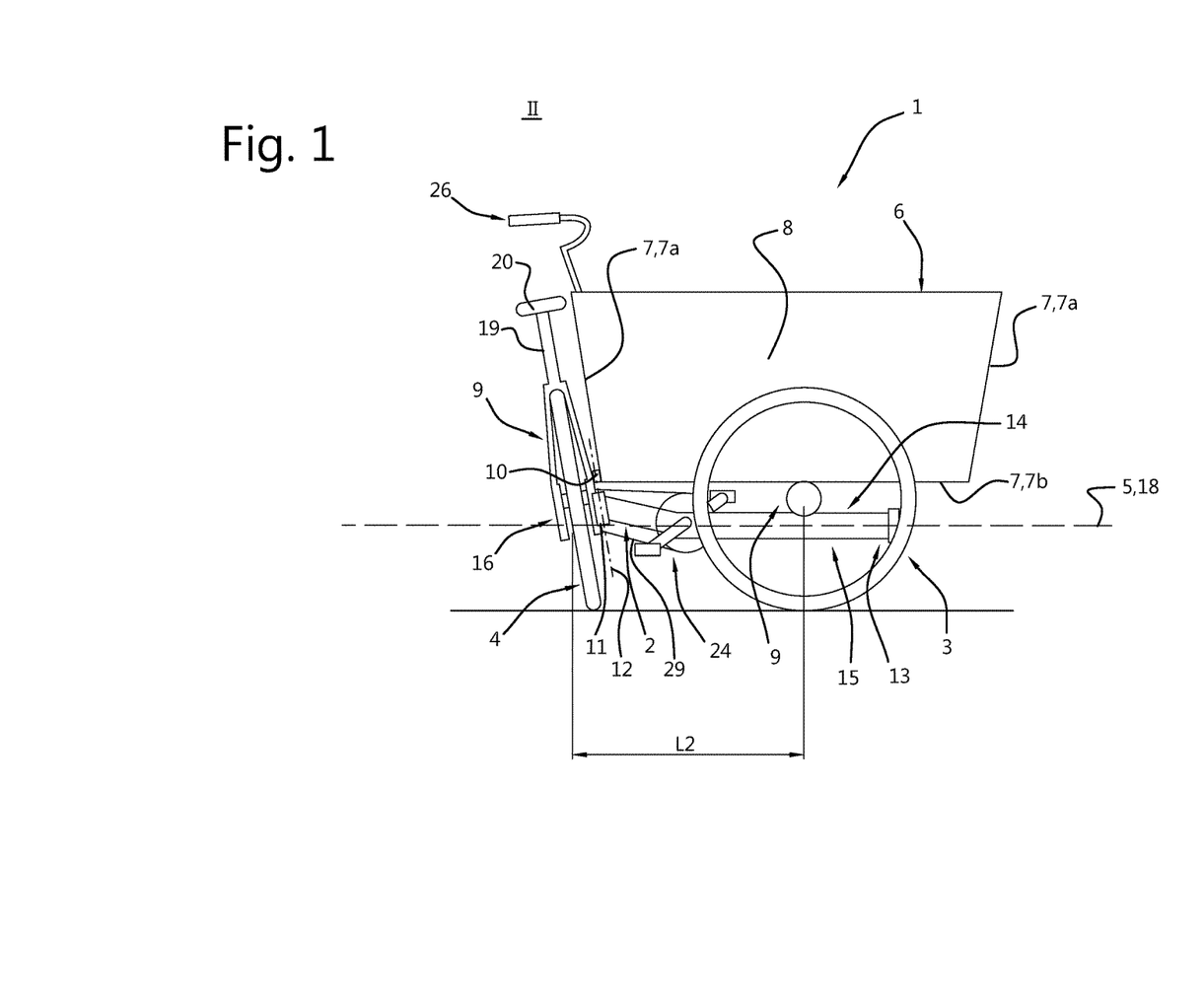
FIG. 1 shows a simplified schematic side view of a first embodiment of a cargo bike according to the invention in a collapsed state.
Figure 6:
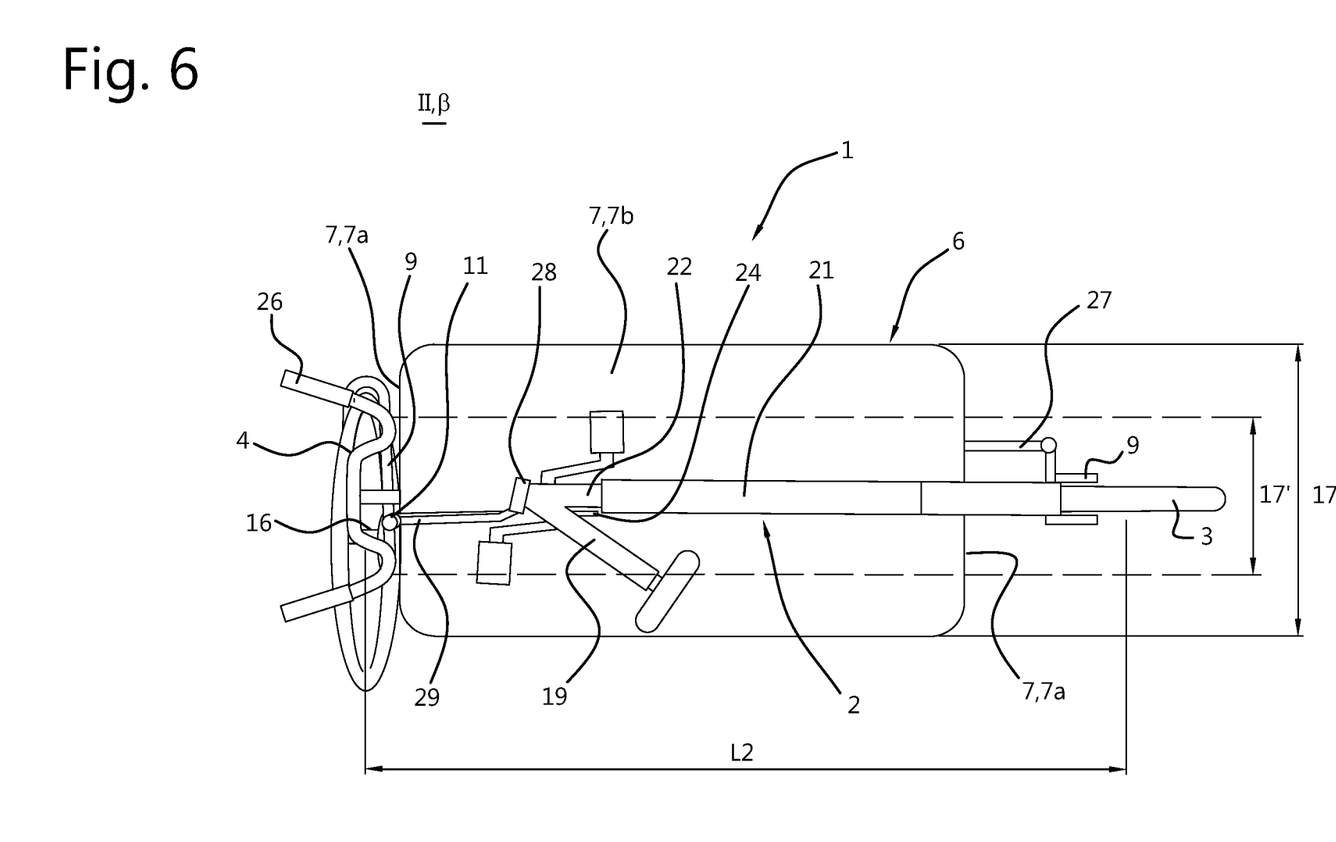
FIG. 6 shows a simplified schematic top view of a fourth embodiment of the cargo bike in a collapsed state.

FIG. 1 shows a first embodiment of a cargo bike 1 in a collapsed state II. The collapsible cargo bike 1 comprises a collapsible frame 2. The collapsible frame is adjustable between an elongate state I in which the collapsible frame 2 positions a front 3 and rear wheel 4 of the cargo bike 1 at a first distance L1 (see FIG. 3) along a longitudinal axis 5 of the cargo bike 1, and a collapsed state II in which the collapsible frame 2 positions the front 3 and rear wheel 4 at a second, smaller distance L2 along the longitudinal axis 5 of the cargo bike 1. The cargo bike 1 comprises a cargo holder 6 for holding cargo. The cargo holder 6 comprises a face 7 that extends substantially transversely to the longitudinal axis 5 of the cargo bike 1, such as a transverse side face 7*a* and a bottom face 7*b* of the cargo holder 6. This exemplary embodiment is a tricycle, such that the cargo bike 1 comprises two front wheels 3 placed along longitudinal side faces 8 of the cargo holder 6. A two-wheeled arrangement wherein a single front wheel 3 is placed at or near an opposite end of the cargo holder 6 with respect to the rear wheel 4 is shown in FIG. 6 and discussed in more detail later on. The front wheel(s) 3 may e.g. be arranged on the cargo holder 6, on the collapsible frame 2 or a wheel support structure 9 of the cargo bike. In this exemplary embodiment, the front wheels 3 are arranged on a wheel support structure 9 that is connected to the cargo holder 6.

Here, in the collapsed state II of the collapsible frame 2 of FIG. 1, the rear wheel 4 extends transversely to the longitudinal axis 5 of the cargo bike 1 and at least partially overlaps with the transversely extending face 7, i.e. the wheel support structure 9 for the rear wheel 4 is placed onto the transverse side face 7a. The cargo bike 1 further comprises a locking mechanism 10 for releasably securing the rear wheel 4 in an end position of the collapsed state II on the transversely extending face 7.

The wheel support structure 9 of the cargo bike 1 for the rear wheel 4, is hingedly connected to the collapsible frame 2. In this exemplary embodiment, the wheel support structure 9 for the rear wheel 4 is connected to the collapsible frame 2 by a stay hinge 11. Here, the stay hinge 11 is provided on a chain stay member (lower) and connects the wheel support structure 9 via the stay hinge 11 to a remaining portion of the collapsible frame 2. Alternatively, the stay hinge may be provided on the seat stay member (upper) or both the seat stay member and the chain stay member. That is to say, the stay hinge 11 hingedly couples the chain stay member to a main tube of the frame as remaining portion of the collapsible frame 2. The stay hinge is positioned in between a wheel suspension of the rear wheel 4 and a crankshaft of the cargo bike 1. Additionally or alternatively, the wheel support structure 9 for the rear wheel 4 may be comprised by or form part of the collapsible frame 2 such that a portion of the collapsible frame 2 is pivotable relative to the collapsible frame 2. Here, in the collapsed state II the wheel support structure 9 is pivoted about the stay hinge 11 with respect to the collapsible frame 2, such that the rear wheel 4 at least partially overlaps with the transverse side face 7a. The stay hinge 11 defines a substantially upright axis 12 that extends substantially transversely to the longitudinal axis 5 of the cargo bike 1. Preferably, the upright axis 12 of the stay hinge 11 extends substantially parallel to the transverse side face 7a of the cargo holder 6 such that at least a portion of the wheel overlaps the transverse side face 7a in the collapsed state II.

In this exemplary embodiment, the front 3 and rear wheels 4 of the cargo bike 1 are provided as typical wheels, that is to say relatively common, commercially available wheels and tires having a nominal rim and tire size of 635 mm according to the European Tyre and Rim Technical Organization (ETRTO) standard. However, any common, commercially available wheel may be provided, e.g. having a nominal rim and tire size in the range between circa 406-642 mm, such as circa 559 mm, 590 mm, 622 mm.

The cargo bike 1 comprises a first hinge 13 that hingedly connects a first part 14 to a second part 15 of the collapsible frame 2, which can be seen more clearly in FIG. 4 and is described later on. The first hinge 13 is located underneath a bottom face 7b of the cargo holder 6. A seat tube 19 of the cargo bike 1, for receiving a seat 20 anchor seat post, is fixed to the wheel support structure 9 of the cargo bike 1. The seat tube 19 and the wheel support structure 9 are pivotable together with respect to collapsible frame 2.

Figure 2:
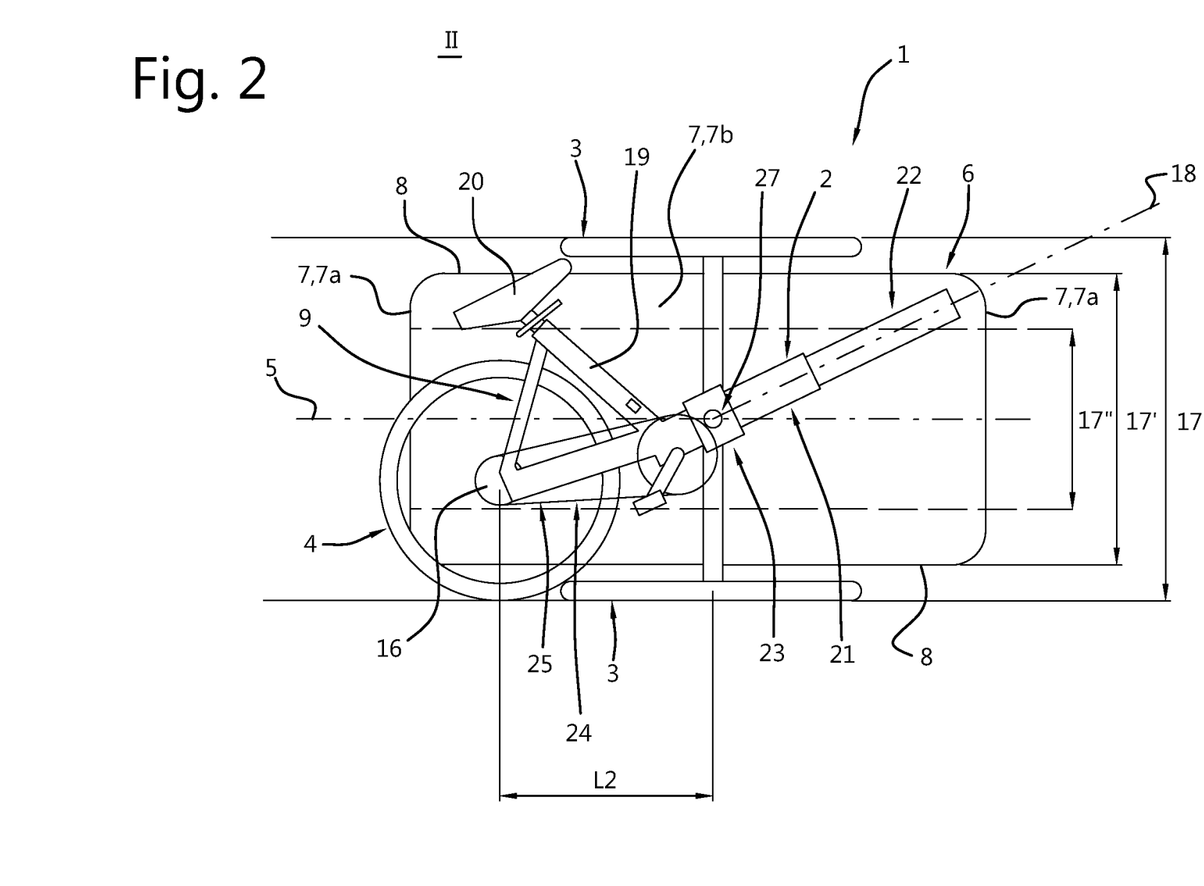
FIG. 2 shows a simplified schematic top view of a second embodiment of the cargo bike in the collapsed state.

FIG. 2 shows a second embodiment of the cargo bike 1 in the collapsed state II of the collapsible frame 2. The wheel support structure 9 for the rear wheel 4 forms part of the collapsible frame 2. A wheel hub 16 of the rear wheel 4 that at least partially overlaps with the bottom face 7b of the cargo holder 6 lies substantially within an envelope 17 defined by transverse boundaries of the cargo bike 1. As can be seen in FIG. 2, the transverse boundaries may be defined by longitudinal side faces 8 of the cargo holder 6, i.e. envelope 17', or by planes of the front wheels 3 extending along said side faces 8, i.e. envelope 17. Here, the wheel hub 16 of the rear wheel 4 lies within an envelope 17". Envelope 17" is defined by a quarter of the distance between the transverse boundaries extending on either side of the longitudinal axis 5 of the cargo bike 1. Furthermore, the wheel hub 16 of the rear wheel 4 is located near the longitudinal axis 5 of the cargo bike 1. In this exemplary embodiment, the longitudinal axis 5 of the cargo bike coincides with the plane of symmetry of the cargo holder 6.

Referring to FIG. 2, at least a portion of the collapsible frame 2 is pivotable about a horizontal axis 18 which in the elongate state of the collapsible frame 2 substantially extends along the longitudinal axis 5 of the cargo bike 1. Here, the collapsible frame 2 is pivotable about the horizontal axis 18 by a quarter turn, e.g. by a provision in the form of one or more stops provided on the collapsible frame 2 that limits the movement about the horizontal axis 18 (not shown). A seat tube 19 of the collapsible frame 2, for receiving a seat 20 and/or seat post, is fixed to the wheel support structure 9, of the collapsible frame 2 and also forms part of the frame 2. The seat tube 19 and the wheel support structure 9 are pivotable together with collapsible frame 2.

The collapsible frame 2 comprises a base part 21 and a telescoping part 22 that is slidable relative to the base part 21 along the longitudinal axis 5 between the elongate state I and the collapsed state II. Conversely, the telescoping part 22 is slidable from the collapsed state II to the elongate state I along the longitudinal axis 5. The base part 21 is arranged as a sleeve around the telescoping part 22, such that the telescoping part 22 is slidable through the base part 21. Also, the base part 21 is slidable relative to a further sleeve 23 that is provided on the cargo holder such that the base part can slide telescopingly with respect to the cargo holder along the longitudinal axis. In this embodiment the cargo bike 1 comprises a drivetrain 24 that includes a chain 25 for driving the drivetrain 24. Alternatively, e.g. a toothed belt may be included for driving the drivetrain 24 or the drivetrain 24 can comprise a driveshaft that cooperates directly with a driven shaft. In the latter case, the driveshaft and driven shaft are e.g. adjustable between a coupled state in which they are in direct contact with each other and a decoupled state in which they are uncoupled and spaced apart. This way, in the decoupled state, the driveshaft and driven shaft can pivot relative to each other together with a pivotable portion of the collapsible frame 2, in particular the wheel support structure 9.

Figure 3:
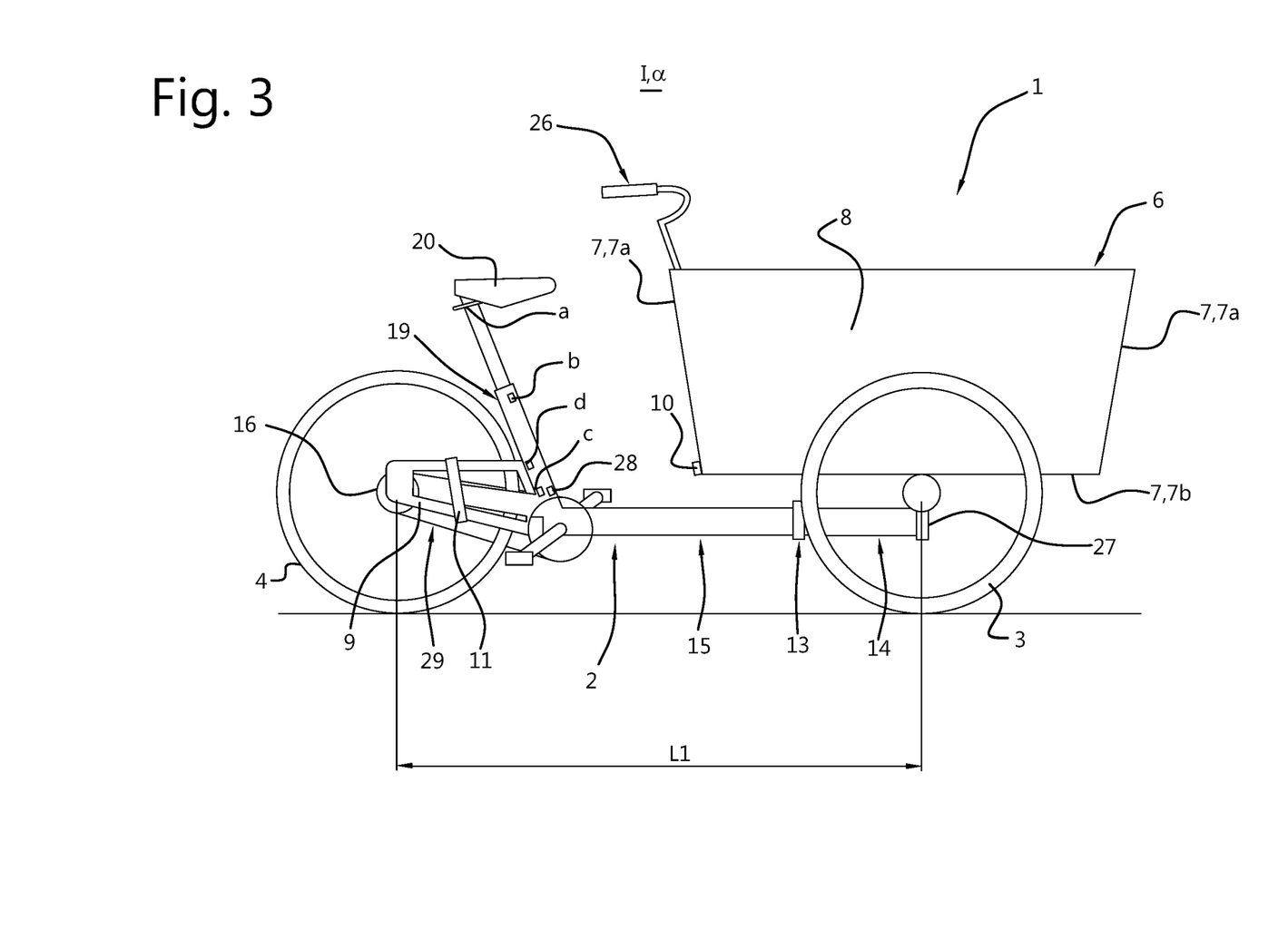
FIG. 3 shows a simplified schematic side view of a third embodiment of the cargo bike in an elongate state.

FIG. 3 shows a third embodiment of the cargo bike 1 in an elongate state I. The collapsible frame 2 positions the front 3 and rear wheel 4 of the cargo bike 1 at the first distance L1 along the longitudinal axis 5 of the cargo bike 1. The cargo bike 1 comprises two front wheels 3 rotatably mounted to the cargo holder 6 via a wheel support structure 9. Steering controls 26, in particular handlebars, are provided on the cargo holder 6. A pivotable steering mechanism 27 of the cargo bike 1 pivotably connects the collapsible frame 2 to the cargo holder 6. The seat tube 19 of cargo bike 1 is hingedly connected to the collapsible frame 2. Thereto, a seat tube hinge 28 is provided. The seat tube 19 is in a folded-out position α in which the seat tube 19 is located further away from a plane that extends underneath and substantially parallel to the bottom face 7b of the cargo holder 6, in particular such that the seat tube 19 extends substantially upright to said plane to provide a seating arrangement in the elongate state I of the collapsible frame 2. A locking means c is provided for releasably securing the seat tube in the folded-out position α. The locking means c also functions as the locking mechanism for releasably securing the first hinge 13 in the respective elongate I and collapsed state II. Also a securing mechanism d is provided for releasably securing the wheel support structure 9 of the rear wheel 4 to the collapsible frame 2. Additionally or alternatively, the securing mechanism d may be provided for releasably securing the seat tube 19 to a wheel support structure 9 of the rear wheel 4. In particular, the securing mechanism d may be controlled by a switch provided on the seat tube 19 (not shown). A quick lock mechanism b is provided for lowering and raising the seat 20 relatively quickly. This way, the seat tube 19 and seat 20 assembly may be adjusted between a lowered and raised state relatively easily, e.g. while taking a user's preferred use height of the seat 20 into account. In particular, the lowering and/or raising of the seat 20 may be used to conveniently control the switch provided on the seat tube 19. Additionally or alternatively, a handle a may conveniently be provided at or near the seat 20 to operate the quick lock mechanism b for lowering and raising the seat 20 (see FIG. 3).

Additionally or alternatively, the pivotable steering mechanism 27 may be arranged to include a steering linkage provided with one or more control rods, a rocker and a steering rod connected to each front wheel 3 or a steering shaft provided with a pinion gear that cooperates with a steering rack of the front wheels 3. In this latter case, the steering rack is connected to each front wheel 3 via a respective pivot joint. Each front wheel 3 mounted on the cargo holder 6 e.g. via a wheel support structure 9 is arranged to pivot around an upright axis that extends substantially transverse to the longitudinal axis 5 of the cargo bike 1 to allow steering thereof. In case of steerable front wheels 3, a pivot locking mechanism (not shown) for releasably securing the cargo holder 6 to the collapsible frame 2 can be provided, for example to lock the cargo bike 1 in the elongate state I.

In this exemplary embodiment, the front 3 and rear wheels 4 of the cargo bike 1 are provided as typical wheels, that is to say relatively common, commercially available wheels and tires having a nominal rim and tire size of 622 mm according to the European Tyre and Rim Technical Organization (ETRTO) standard. However, any common, commercially available wheel may be provided, e.g. having a nominal rim and tire size in the range between circa 406-642 mm, such as circa 559 mm, 590 mm, 622 mm.

Figure 4:
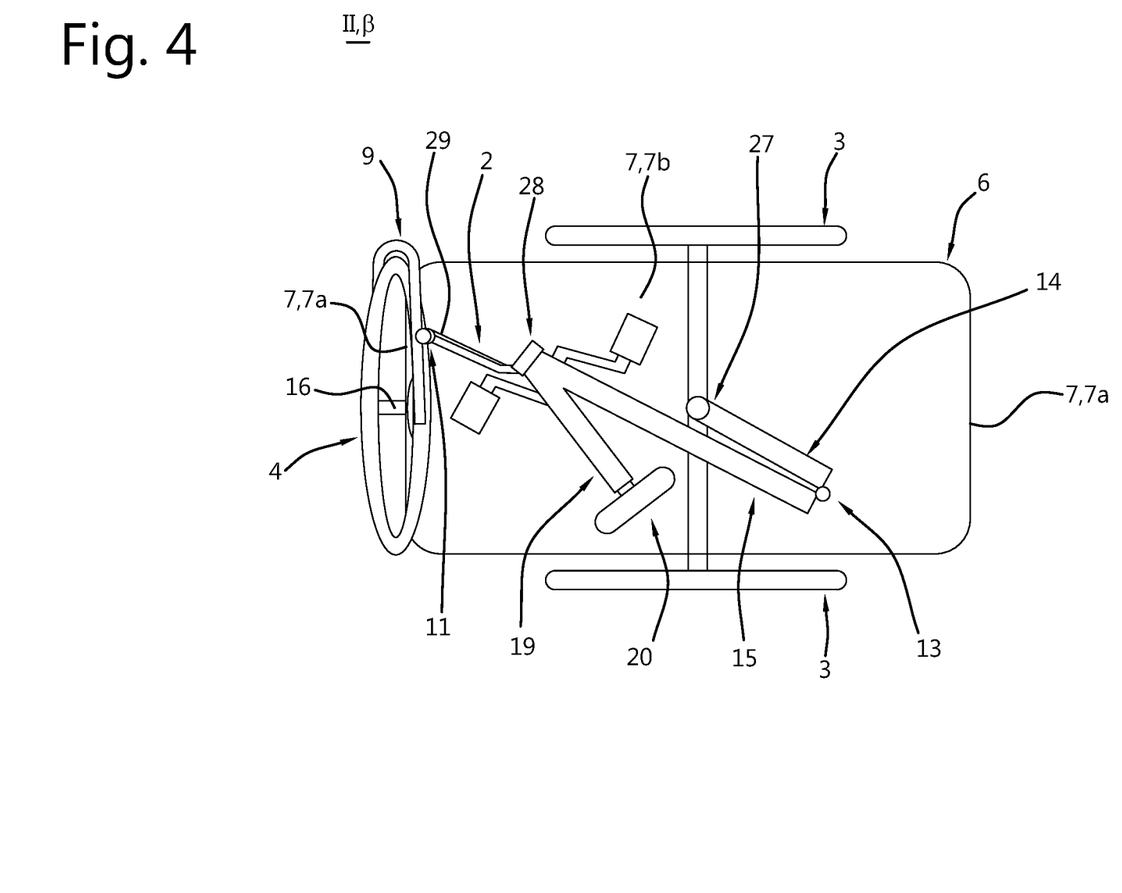
FIG. 4 shows a simplified schematic top view of the cargo bike of FIG. 3 in the collapsed state.

FIG. 4 shows a simplified schematic top view of the cargo bike 1 of FIG. 3 in the collapsed state II. Here it can be seen that the pivotable steering mechanism 27 acts as a second hinge that hingedly connects the first part 14 of the collapsible frame 2 to the cargo holder 6. The first and second parts 14, 15 are collapsed towards each other. In particular, the first hinge 13 and second hinge in the form of the pivotable steering mechanism 27 are placed such that the first and second parts 14, 15 of the collapsible frame 2 are partly extended alongside each other in the collapsed state II. Additionally or alternatively, the cargo bike 1 may comprise a second hinge that hingedly connects the second part 15 to a third part of the collapsible frame 2, wherein the second hinge is lockable in the respective elongate and collapsed states (not shown). For example, this could advantageously be implemented in a two wheeled cargo bike 1 to achieve the same result.

Figure 5:
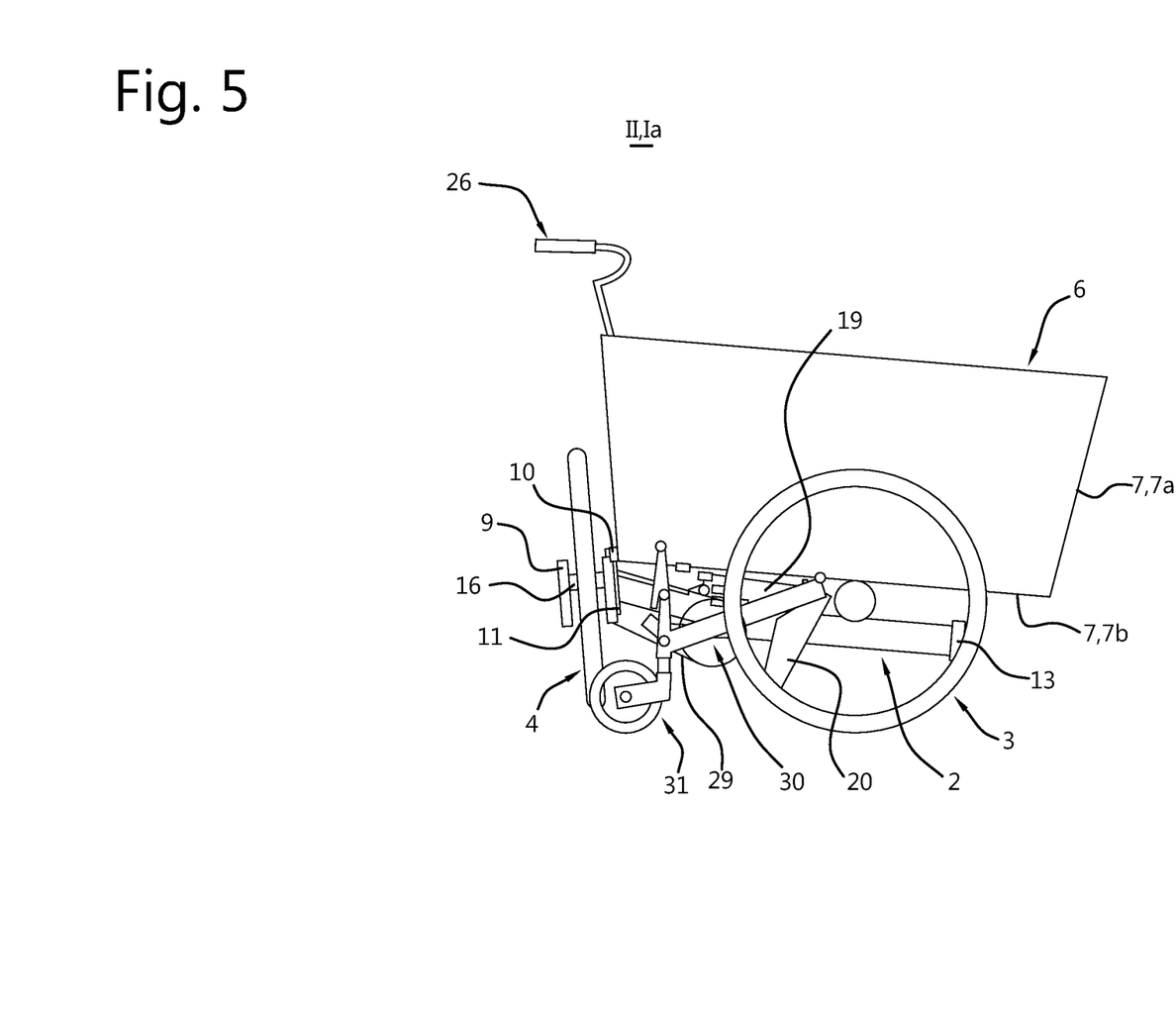
FIG. 5 shows a simplified schematic side view of the cargo bike of FIG. 3 in collapsed state with a retractable support wheel assembly.

In FIG. 4-6, the seat tube 19 including seat and seat post are in a folded-in position 13. In the folded-in position β the seat tube 19 is located nearer the plane that extends underneath and substantially parallel to the bottom face 7b of the cargo holder 6. As shown, in the collapsed state II of the collapsible frame 2, the seat tube 19 in the folded-in position β extends underneath the bottom face of the cargo holder 6 and within the envelope 17 defined by transverse boundaries of the cargo bike 1 (FIG. 6). In the exemplary embodiments, the seat tube hinge 28 is inclined with respect to the collapsible frame 2 such that the seat tube 19 is offset from the collapsible frame 2 in the folded-in position β. However, the seat tube hinge 28 may also be provided substantially transverse to the collapsible frame 2 such that the seat tube 19 extends substantially along the collapsible frame 2 in the folded-in position β. Preferably, the seat tube hinge 28 is arranged such that in the folded-in position β, the seat tube 19 including the seat and/or seat post lie within the envelope 17 defined by the transverse boundaries of the cargo bike 1. More preferably, in the collapsed state II of the collapsible frame 2 and the folded-in position β of the seat tube 19, the seat tube 19 including the seat and/or seat post lie underneath the bottom face 7b of the cargo holder 6. In the exemplary embodiments of FIGS. 4-6, the drivetrain 24 of the cargo bike 1 includes a toothed belt 29 for power transmission in the drivetrain 24. The toothed belt 29 is partly folded around the stay hinge 11. Thereto, the stay hinge 11 may be provided with a guide (not shown) to guide the toothed belt 29 safely between an operating state and a folded state of the toothed belt 29 in a manner known to the skilled person.

FIG. 5 shows a simplified schematic side view of the cargo bike 1 of FIG. 3 in collapsed state II comprising a retractable support wheel assembly 30. The retractable assembly 30 for at least one support 31, in particular a swivel wheel, is mounted to the cargo holder 6. The retractable assembly 30 is in a support state Ia in which the at least one support 31 is lowered for supporting the cargo bike 1 on a surface. The retractable assembly 30 is adjustable to a retracted state in which the at least one support is retracted in a direction of the collapsible frame 2 and/or cargo holder 6 (not shown).

As in the other embodiments in the collapsed state II of the collapsible frame 2, the rear wheel 4 is placed out of the way. Here, the steering controls 26, in particular handlebars, are accessible to a user for pushing the cargo bike 1 as a pushcart.

FIG. 6 shows a simplified schematic top view of a fourth embodiment, in particular a two-wheeled arrangement, of the cargo bike 1 in the collapsed state II. In the collapsed state II, the collapsible frame 2 positions the front 3 and rear wheel 4 at a distance L2 along the longitudinal axis 5 of the cargo bike 1. Here, the front wheel 3 is provided in front of the transverse side face 7a of the cargo holder 6 to allow room for pivoting the front wheel 3 relative to the collapsible frame 2. Thereto, the wheel support structure 9, in particular the front fork, for supporting the front wheel 3 is pivotably arranged on the collapsible frame 2. The wheel hub 16 of the front wheel 3 is rotatably mounted to the wheel support structure 9 of the front wheel 3. The steering controls 26, in particular handlebars, are connected to the wheel support structure 9 of the front wheel 3 via the pivotable steering mechanism 27 in a manner known to the skilled person. Thereby, the front wheel 3 is steerable by the steering controls 26.

The wheel support structure 9 of the rear wheel 4 is hingedly connected to the collapsible frame 2 through stay hinge 11. As can be seen in FIG. 6, in the collapsed state II of the collapsible frame 2 the rear wheel 4 extends substantially transversely to the longitudinal axis 5 of the cargo bike 1 and at least partially overlaps with the transversely extending face 7. Furthermore, the wheel hub 16 of the rear wheel 4 that at least partially overlaps with the transversely extending face 7 lies substantially within the envelope 17 defined by transverse boundaries of the cargo bike 1. Preferably, the wheel hub 16 of the rear wheel 4 lies within the envelope 17' defined by a quarter of the distance between the transverse boundaries extending on either side of the longitudinal axis 5 of the cargo bike 1 to allow a compact construction in the collapsed state. The drivetrain 24 includes a toothed belt 29 to enable pivoting of the wheel support structure 9 of the rear wheel 4.

In this embodiment, the base part 21 of the collapsible frame 2 is arranged as a sleeve around the telescoping part 22 of the collapsible frame 2, such that the telescoping part 22 is slidable through the base part 21. The telescoping part 22 is slidable relative to the base part 21 along the longitudinal axis 5 between the elongate state I and the collapsed state II, and between the collapsed state II and the elongate state I. A locking mechanism may be provided that locks the collapsible frame 2 in each of the respective elongate I and collapsed state II. To slide the collapsible frame 2 into the elongate state I, the telescoping part 22 slides out of the base part 21. Subsequently, the seat tube 19 is folded upright into the folded-out position α about seat tube hinge 28, and then the wheel support structure 9 and rear wheel 4 are pivoted about stay hinge 11 to extend along the longitudinal axis 5 of the cargo bike 1. Preferably, the wheel support structure 9 of the rear wheel 4 is secured to the collapsible frame 2 by a securing mechanism. Preferably, the two-wheeled arrangement of the cargo bike 1 also comprises a retractable support assembly 30 with support wheels 31 to provide stability in the collapsed state II of the collapsible frame 2. In this case, the cargo bike 1 in the collapsed state II of the frame may be operated as a pushcart with a steerable front wheel 3.

Additionally or alternatively, in the collapsed state II, the front wheel 3 may extend transversely to the longitudinal axis 5 of the cargo bike 1 and at least partially overlap with the transversely extending face 7. In this manner, the front wheel 3 can be collapsed and a side face of the front wheel 3 and/or the wheel support structure 9 of the front wheel 3 may be placed along the transversely extending face 7 at least partly. In this case, a further retractable support assembly 30 with support wheels 31 may be provided to allow the cargo bike 1 in the collapsed state II of the collapsible frame 2 to be used as a pushcart.

In FIG. 3-6, the stay hinge 11 is provided on chain stay members (upper and lower) and connects the wheel support structure 9 via the stay hinge 11 to a remaining portion of the collapsible frame 2. That is to say, the stay hinge 11 hingedly couples the seat stay member and chain stay member to the remaining portion of the collapsible frame 2. The stay hinge is positioned in between a wheel hub of the rear wheel 4 and a seat tube of the cargo bike 1. By positioning the stay hinge more towards the wheel hub, it may be achieved that in the collapsed state of the collapsible frame at least one of the wheels extends transversely to the longitudinal axis of the cargo bike and at least partially overlaps with the transversely extending face. Thereby, a compact construction may be realized in the collapsed state, in particular that is relatively easy to operate and adjust between the respective elongate and collapsed state. Alternatively, the wheel support structure 9 may e.g. comprise only a chain stay member or a seat stay member (i.e. without a seat stay member or a chain stay member, respectively), or a fork of a front wheel, that is hingedly coupled to the remaining portion of the collapsible frame via a stay hinge. It will be clear to the skilled person that the invention is not limited to the exemplary embodiments represented here. Many variations are possible. For example, the collapsible cargo bike may be provided with a combustion engine and/or an electrical system, comprising an electrical motor and a battery, for powering and/or assisting the cargo bike, either in one of or both the cargo bike mode and the pushcart mode. For instance, the drivetrain may be arranged to drive the front wheel(s). Also, the cargo holder, in particular the bottom face of the cargo holder, may comprise a sunken section e.g. for improved cargo space or a raised section e.g. to provide a seating arrangement in the cargo holder. Further, the cargo holder may be detachably provided on the frame of the cargo bike, such that the cargo holder can be decoupled from the cargo bike. Furthermore, the cargo bike may be provided with suspension, in particular seat post, front and/or rear suspension. Suspension is often used in order to compensate roughness of the terrain. For instance, the wheels may be provided as typical wheels, that is to say relatively common, commercially available wheels and tires having a nominal rim and tire size, e.g. in the range between circa 406-642 mm, such as circa 559 mm, 590 mm, 622 mm of 622 mm according to the European Tyre and Rim Technical Organization (ETRTO) standard. Such variations shall be clear to the skilled person and are considered to fall within the scope of the invention as defined in the appended claims.

LIST OF REFERENCE SIGNS

1. Cargo bike
2. Collapsible frame
3. Front wheel
4. Rear wheel
5. Longitudinal axis
6. Cargo holder
7. Transversely extending face of cargo holder
7a. Transverse side face of cargo holder
7b. Bottom face of cargo holder
8. Longitudinal side face of cargo holder
9. Wheel support structure
10. Locking mechanism
11. Stay hinge
12. Upright axis
13. First hinge
14. First part of collapsible frame
15. Second part of collapsible frame
16. Wheel hub
17. Envelope defined by transverse boundaries of the cargo bike
17'. Envelope defined by transverse boundaries of the cargo holder
17". Envelope defined by a quarter of the distance between the transverse boundaries extending on either side of the longitudinal axis of the cargo bike.
18. Horizontal axis
19. Seat tube
20. Seat
21. Base part of collapsible frame
22. Telescoping part of collapsible frame
23. Further sleeve
24. Drivetrain
25. Chain
26. Steering controls
27. Pivotable steering mechanism
28. Seat tube hinge
29. Toothed belt
30. Retractable support assembly
31. Support/swivel wheel I. Elongate state of the collapsible frame
II. Collapsed state of the collapsible frame
Ia. Support state of the retractable support assembly
α. Folded-out position of the seat tube
β. Folded-in position of the seat tube
L1. First distance along longitudinal axis
L2. Second distance along longitudinal axis
a. Handle for operating a quick lock mechanism
b. Quick lock mechanism
c. Locking means
d. Securing mechanism

The invention claimed is:

1. A cargo bike comprising a collapsible frame, the collapsible frame being adjustable between an elongated state in which the collapsible frame positions a front and rear wheel of the cargo bike at a first distance along a longitudinal axis of the cargo bike, and a collapsed state in which the collapsible frame positions the front and rear wheel at a second, smaller distance along the longitudinal axis of the cargo bike, a cargo holder for holding cargo that comprises a face that extends substantially transversely to the longitudinal axis, and wherein in the collapsed state of the collapsible frame at least one of the wheels extends transversely to the longitudinal axis of the cargo bike and at least partially overlaps with the transversely extending face wherein at least a portion of a wheel support structure of the cargo bike forms a pivotable portion of the collapsible frame, wherein said pivotable portion of the collapsible frame is hingedly connected to a remaining portion of the collapsible frame by at least one hinge so as to be pivotable about an upright axis that extends substantially transversely to the longitudinal axis of the cargo bike, wherein said at least one hinge is provided on the wheel support structure in between a wheel suspension of the rear wheel and a crank shaft of the cargo bike.

2. The cargo bike according to claim 1, wherein in the collapsed state of the frame a wheel hub of the at least one wheel that at least partially overlaps with the transversely extending face lies substantially within an envelope defined by transverse boundaries of the cargo bike when the collapsible frame is in the elongated state.

3. The cargo bike according to claim 1, wherein in the collapsed state of the frame a wheel hub of the at least one wheel that at least partially overlaps with the transversely extending face in the collapsed state of the frame is located at or near the longitudinal axis of the cargo bike, in particular at or near the plane of symmetry of the cargo holder.

4. The cargo bike according to to claim 1, wherein the collapsible frame comprises a base part and a telescoping part that is slidable relative to the base part along the longitudinal axis between the elongated state and the collapsed state, and vice versa.

5. The cargo bike according to claim 4, wherein the base part is arranged as a sleeve around the telescoping part, such that the telescoping part is slidable through the base part.

6. The cargo bike according to claim 1, comprising a first hinge that hingedly connects a first part to a second part of the collapsible frame, and wherein the first hinge is lockable in the respective elongated and collapsed states.

7. The cargo bike according to claim 6, further comprising a second hinge that hingedly connects the second part to a third part of the collapsible frame, wherein the second hinge is lockable in the respective elongated and collapsed states.

8. The cargo bike according to claim 1, wherein in the collapsed state substantially the entire collapsible frame is stowed away along faces of the cargo holder that extend transversely to the longitudinal plane of the cargo bike and wherein the collapsible frame lies substantially within an envelope defined by transverse boundaries of the cargo bike when the collapsible frame is in the elongated state.

9. The cargo bike according to claim 1, wherein a drivetrain of the cargo bike includes a toothed belt for power transmission in the drivetrain.

10. The cargo bike according to claim 1, wherein a seat tube of the cargo bike for receiving a seat and/or seat post is fixed to the pivotable portion, in particular the wheel support structure, of the cargo bike, such that they are pivotable together with the collapsible frame or with respect to the collapsible frame.

11. The cargo bike according to claim 1, wherein a seat tube of the cargo bike for receiving a seat and/or seat post is hingedly connected to the collapsible frame, such that the seat tube is foldable between a folded-in position in which the seat tube is located nearer a plane that extends underneath and substantially parallel to a bottom face of the cargo holder, and a folded-out position in which the seat tube is located further away from said plane, in particular such that the seat tube extends substantially upright to said plane to provide a seating arrangement in the elongated state of the collapsible frame.

12. The cargo bike according to claim 1, wherein the cargo bike is a tricycle comprising two front wheels rotatably mounted to the cargo holder, wherein steering controls, in particular handlebars, are provided on the cargo holder, wherein a pivotable steering mechanism of the cargo bike pivotably connects the collapsible frame to the cargo holder, and wherein in the collapsed state of the collapsible frame the rear wheel is placed out of the way, such that the steering controls, in particular the handlebars, are accessible to a user for pushing the cargo bike as a pushcart.

13. The cargo bike according to claim 1, further comprising at least one support supported on the frame and/or the cargo holder for supporting the cargo bike on a surface, in particular the ground.

14. The cargo bike according to claim 13, comprising a retractable assembly for the at least one support that is adjustable between a retracted state in which the at least one support is retracted in a direction of the frame and/or cargo holder, and a support state in which the at least one support is lowered for supporting the cargo bike on a surface.

15. The cargo bike according to claim 13, wherein the at least one support comprises or is formed by a wheel, in particular a swivel wheel.

16. The cargo bike according to claim 2, wherein in the collapsed state of the frame the wheel hub of the at least one wheel that at least partially overlaps with the transversely extending face lies within an envelope defined by a quarter of the distance between the transverse boundaries extending on either side of the longitudinal axis of the cargo bike.

17. The cargo bike according to claim 5, wherein the base part is slidable relative to a further sleeve that is provided on the cargo holder such that the base part can slide telescopingly with respect to the cargo holder along the longitudinal axis.

18. The cargo bike according to claim 6, wherein the first hinge is located underneath a bottom face of the cargo holder.

19. The cargo bike according to claim 1, wherein the rear wheel has a nominal rim and tire size in a range from about 406 mm to about 642 mm.

* * * * *